United States Patent [19]

Ryham

[11] Patent Number: 4,925,527

[45] Date of Patent: May 15, 1990

[54] METHOD FOR THE RECOVERY OF TURPENTINE AND HEAT IN A REFINER PULPING PROCESS

[75] Inventor: Rolf Ryham, Princeton, N.J.

[73] Assignee: Ahlströmföretagen Svenska AB, Norrköping, Sweden

[21] Appl. No.: 313,797

[22] Filed: Feb. 22, 1989

[51] Int. Cl.⁵ .............................................. D21C 11/06
[52] U.S. Cl. ...................................... 162/15; 162/46; 162/47
[58] Field of Search .................. 162/14, 15, 16, 46, 162/47

[56] References Cited

U.S. PATENT DOCUMENTS

| | | | |
|---|---|---|---|
| 3,432,402 | 3/1969 | Herrlinger et al. | 162/16 |
| 3,816,239 | 6/1974 | Marks | 162/15 |
| 4,231,842 | 11/1980 | Ojala | 162/47 |
| 4,274,911 | 6/1981 | Kroneld et al. | 162/16 |

Primary Examiner—Steve Alvo
Attorney, Agent, or Firm—Cohen, Pontani & Lieberman

[57] ABSTRACT

A method for recovering turpentine and heat in a TMP process in which woodchips are heated in a preheater and the vent vapors from the preheater are passed to the condensing vapor zone of an evaporator condenser-reboiler having a condensing vapor zone and a boiling liquid zone. A major portion of the vent vapors are condensed so as to produce a turpentine-lean condensate and turpentine-rich vapor phase. The turpentine-rich vapor phase is withdrawn from the evaporator and passed to a turpentine condenser where it is cooled by indirect heat exchange contact with a cooling liquid to produce a condensate containing immiscible turpentine and aqueous phases. The turpentine and the aqueous phases are separated. The aqueous phase and the condensate produced when vent vapors from the preheater are condensed are passed to the boiling liquid zone of the evaporator and brought into indirect heat exchange contact with the vent vapors from the preheater while maintaining a lower pressure in the boiling liquid zone than in the condensing vapor zone whereby a turpentine-lean vapor is produced. The turpentine-lean is used to presteam the woodchips before they are supplied to the heater.

22 Claims, 3 Drawing Sheets

METHOD FOR THE RECOVERY OF TURPENTINE AND HEAT IN A REFINER PULPING PROCESS

FIELD OF THE INVENTION

The present invention relates to the recovery of turpentine and heat in wood-pulping processes. More particularly, the invention pertains to a method for recovering turpentine and heat in a thermomechanical or a chemithermomechanical pulping process directly from preheater vent steam and/or refiner back flow steam.

BACKGROUND OF THE INVENTION

In the thermomechanical pulping (TMP) process, the wood material is introduced in form of chips together with water between the rotating discs of a refiner. Electrical energy is added and a large portion of the water heated is converted into steam.

The woodchips to be refined undergo a three step treatment before entering the refiner. In the first step, the woodchips are presteamed at atmospheric pressure by steam from a preheater. After being heated to about 70°-90° C., the chips are placed into a chip washer where debris like sand is removed. The washed chips are then fed by a screw feeder under high pressure into the preheater. The turpentine condensed on the chip surface in the presteamer and pitch are squeezed out together with the excess water from the chip washer. The steam used in the preheater is steam flowing back from the refiner. Although only about 20% of the steam generated in the refiner flows back to the preheater, this backflow steam contains generally over about 80% of the total turpentine content. Turpentine is therefore normally not recovered but is removed together with the waste water.

U.S. Pat. No. 3,816,239 proposes a method for recovering terpenes from a wet, gaseous steam containing terpene vapor and water vapor by condensing water from the steam by indirect heat exchange to produce an aqueous liquid terpene-lean condensate phase while leaving a first terpene-rich vapor phase. The aqueous terpene-lean condensate is separated from said vapor phase, subcooled and used as the indirect heat exchange medium at boiling for condensing additional terpene-lean condensate from the wet, gaseous stream. During this indirect heat exchange, a portion of the terpene-lean condensate is flash vaporized and these distillate vapors are combined with the first terpene-rich vapor phase for recovery of terpenes therefrom by condensation at a temperature below the dew point temperature of the terpene component. This patent does not, however, propose the recovery of the heat from the gaseous stream for the purpose of heating wood chips.

It is an object of the present invention to recover turpentine which is boiled off from the wood together with water vapor during the woodchips refining process.

In addition to the recover of turpentine contained in the preheater vent and refiner backflow steam, it is a characteristic feature of the present invention that heat is recovered from the refiner backflow steam by condensing a major portion of the vent vapor. If no boiler feed water is used as a medium for generating steam for presteaming the woodchips, the condensate of the vent vapor in the evaporator condenser reboiler is reboiled so as to produce steam for the preheating and presteaming the woodchips to be refined. On the other hand, if the steam for presteaming the woodchips is generated from boiler feed water, clean steam will be produced and it is not necessary to first condense and then reboil the condensate so as to produce steam for the presteamer.

SUMMARY OF THE INVENTION

In accordance with one embodiment of the present invention, woodchips are heated in a preheater and the vent vapors from the preheater are passed to the condensing vapor zone of an evaporator (condenser-reboiler) having a condensing vapor zone and a boiling liquid zone. A major portion of the vent vapors are condensed so as to produce a turpentine-lean condensate and turpentine-rich vapor phase. The turpentine-rich vapor phase is withdrawn from the evaporator and passed to a turpentine condenser where it is cooled by indirect heat exchange contact with a cooling liquid to produce a condensate containing immiscible turpentine and aqueous phases. The turpentine and the aqueous phases are separated. The turpentine-lean steam generated in the evaporator reboiler is used to presteam the woodchips before they are supplied to the preheater.

The pressure during the boiling step in the evaporator (boiling) liquid zone is maintained at a lower level than the pressure in the condensing vapor zone so as to bring about a lower boiling point temperature of the liquid and thus cause heat transfer from the condensing vapor zone to the boiling liquid zone.

The condensation temperature in the condensing vapor zone depends upon the pressure and is selected so that the temperature at the prevailing pressure is above the dew point temperature of the turpentine so that substantially only water condenses and the major portion of the turpentine does not condense. This results in a turpentine-lean condensate and a turpentine-rich vapor phase.

As indicated the turpentine is recovered by condensing the turpentine-rich vapor phase by indirect heat exchange below the dew point temperature of the turpentine to produce immiscible turpentine and water phases.

The immiscible condensate phases are preferably separated into an overflow turpentine phase and an underflow water phase in a decanter. Alternatively, the immiscible condensate phases can be separated by any other conventional separating method.

In another embodiment of the present invention turpentine containing excess steam from the preheater (preheater vent) is condensed directly in a turpentine condenser reboiler whereby heat is transported to a circulating stream of boiler feed water to produce clean steam for introduction into a woodchips presteamer. Turpentine-rich vapor is withdrawn from the turpentine reboiler, and may be condensed in a turpentine condenser and separated from the aqueous phase in a turpentine decanter as described.

In a third embodiment of the invention the preheater vent steam is introduced directly into the turpentine condenser and essentially all of the primary refiner backflow steam is introduced into the turpentine reboiler for recovery of the turpentine and generation of steam from boiler feed water to result in clean steam for presteaming the woodchips. A part of the clean steam exiting the evaporator condenser reboiler is fed into the preheater.

BRIEF DESCRIPTION OF THE DRAWING

The invention is described in more detail below with reference to the drawings in which.

DETAILED DESCRIPTION OF THE DRAWING

Figure 1:
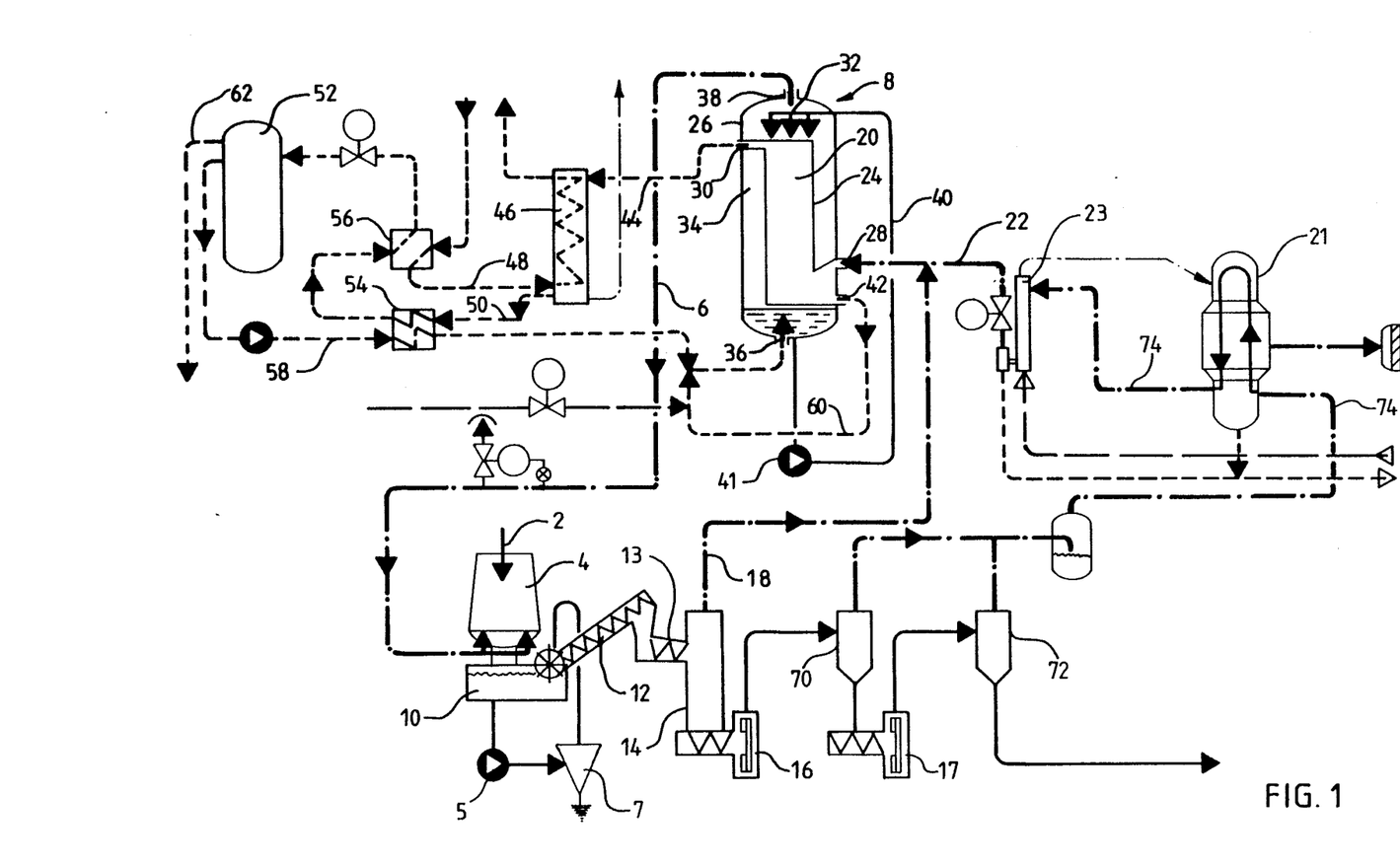
FIG. 1 is a schematic flow diagram illustrating a first embodiment of the invention.

As shown in FIG. 1, woodchips 2 enter steaming vessel or presteamer 4 wherein the woodchips are steamed at atmospheric pressure with vapor supplied in stream 6 from evaporator (condenser-reboiler) 8 so as to heat the chips to a temperature of about 70°–90° C. After being heated, the chips are placed into a chip washer 10 in which debris such as sand is removed by gravity separation in known manner by pump 5 and hydrocyclone 7. The washed chips are then fed under high pressure by a screw feeder 12 and plug screw 13 into a preheater 14. The water vapor condensed on the surfaces of the chips in the presteamer 4 and pitch is squeezed out together with excess water from the chip washer. The chips are heated in the preheater 14 by backflow steam from the refiner 16 to a temperature of about 110°–150° C. at a pressure of about 2-=bar to achieve favorable conditions for the refining process. As indicated above, about 20% of the steam generated in refiner 16 and containing above about 80% of the total amount of turpentine present in the wood is fed back to preheater 14.

The steam utilized for presteaming the woodchips in presteamer 4 is vapor which is generated in the condenser reboiler wherein the backflow steam from the refiner is condensed on the condensing side thereof.

The woodchips are refined between rotating disks in first stage refiner 16 of a TMP system, heat and steam is generated by the addition of electrical energy and a substantial portion of the generated steam containing essentially all of the turpentine flows back from the refiner 16 to preheater 14. In the preheater a portion of the vapor is condensed by preheating the chips. The remainder is vented from the preheater 14 as a vapor stream 18 composed of water vapor and turpentine vapor. The vapor stream 18 flows into the condensing vapor zone 20 of the evaporator condenser reboiler 8. A vent vapor stream 22 from a TMP main reboiler 21 is combined with the vapor stream 18 for recovery of the turpentine. TMP steam coming from one or more refiners 16, 17 and having been separated from the pulp in one or more cyclones as described below, is introduced into main TMP reboiler 21 and from there via vent heater or heat exchanger 23 via line 22 into evaporator condenser reboiler 8.

Evaporator 8 may include a plurality of vertical heat exchange elements 24 which may be composed of pairs of substantially parallel plates connected at their edges to form closed spaces within a casing 26. The interiors of the heat exchange element which form the condensing vapor zone are connected at their lower end to an inlet 28 for the admission of the vapor and at their upper end to an outlet 30 for the removal vapor. A distributor 32 is provided above the heat exchange elements to form means for distributing liquid substantially uniformly over the outer surfaces of the heat exchange elements. The space surrounding the heat exchange elements forms a boiling liquid zone 34 within the casing 26. The casing 26 is provided with an inlet 36 in its lower end for the admission of liquid to the boiling liquid zone 34 and an outlet 38 in its upper end for the removal of vapor. Liquid collected at the bottom of the casing is withdrawn from the evaporator and recirculated to the distributor 32 through line 40. An outlet 42 is provided for the removal of condensate produced in the condensing vapor zone 20. As is described below, if boiler feed water is used in the turpentine reboiler evaporator 8 (instead of backflow of vent steam) it is not necessary that reboiler 8 is of the plate type.

In operation, the vapor stream 18 vented from the preheater 14 is introduced into the inlet 28 of the evaporator 8 and is caused to flow through the condensing vapor zone 20 in an upward direction. A major portion of the vent vapors condense in the condensing vapor zone at a temperature above the dew point temperature of the turpentine. The turpentine-lean condensate which is produced flows downwards i.e. countercurrent to the vapors and flows out through outlet 42 through line 60 where it is combined with separated aqueous phase from line 53 and introduced back into the bottom of evaporator condenser reboiler 8. The remainder of the vapor is removed as a turpentine-rich vapor phase through outlet 30 as stream 44.

The turpentine-rich vapor stream 44 flows to a turpentine condenser 46 where the vapors are condensed in indirect heat exchange with cooling liquid stream 48 to form a two-phase condensate comprising a turpentine phase and an aqueous phase. The condensate is passed as stream 50 to a decanter 52 via two heat exchanger 54 and 56. In heat exchanger 54 the aqueous phase stream 58 which has been separated in the decanter 52 is indirectly heated by the condensate stream 50. In heat exchanger 56 the condensate stream 50 is indirectly cooled by the cooling liquid stream 48. In the decanter 52 the condensate is separated in known manner due to the density differential thereof into a turpentine overflow phase and an aqueous underflow phase. The turpentine phase is removed as stream 62. The aqueous phase stream 58 is either discharged o combined with the turpentine lean condensate flowing out from the evaporator as stream 60 and returned through inlet 36 to the lower end of the evaporator casing to be reboiled in the boiling liquid zone 34.

The liquid collected in the lower end of the evaporator is passed through line 40 to the distributor 32. From there it flows down over the outer surfaces of the heat exchange elements 24 and is thereby heated by indirect contact with the vapor located inside the heat exchange elements. On the outside of the heat exchange elements, i.e. in the boiling liquid zone 34 of the evaporator which is connected to the steaming vessel 4, a lower pressure is maintained than in the inside of the heat exchange elements, i.e. in the condensing vapor zone 20 which is connected to the preheater 14, to bring about a temperature differential between the condensing vapor and the boiling liquid. A temperature gradient is thus provided for heat transfer from the inside of the heat exchange elements to the outside and reboiling of the condensed vapor is effected.

The steam produced in the boiling liquid zone of the evaporator is removed through outlet 38 as vapor stream 6 and is passed to the steaming vessel 4 to presteam the woodchips to be refined in the TMP process.

Figure 2:
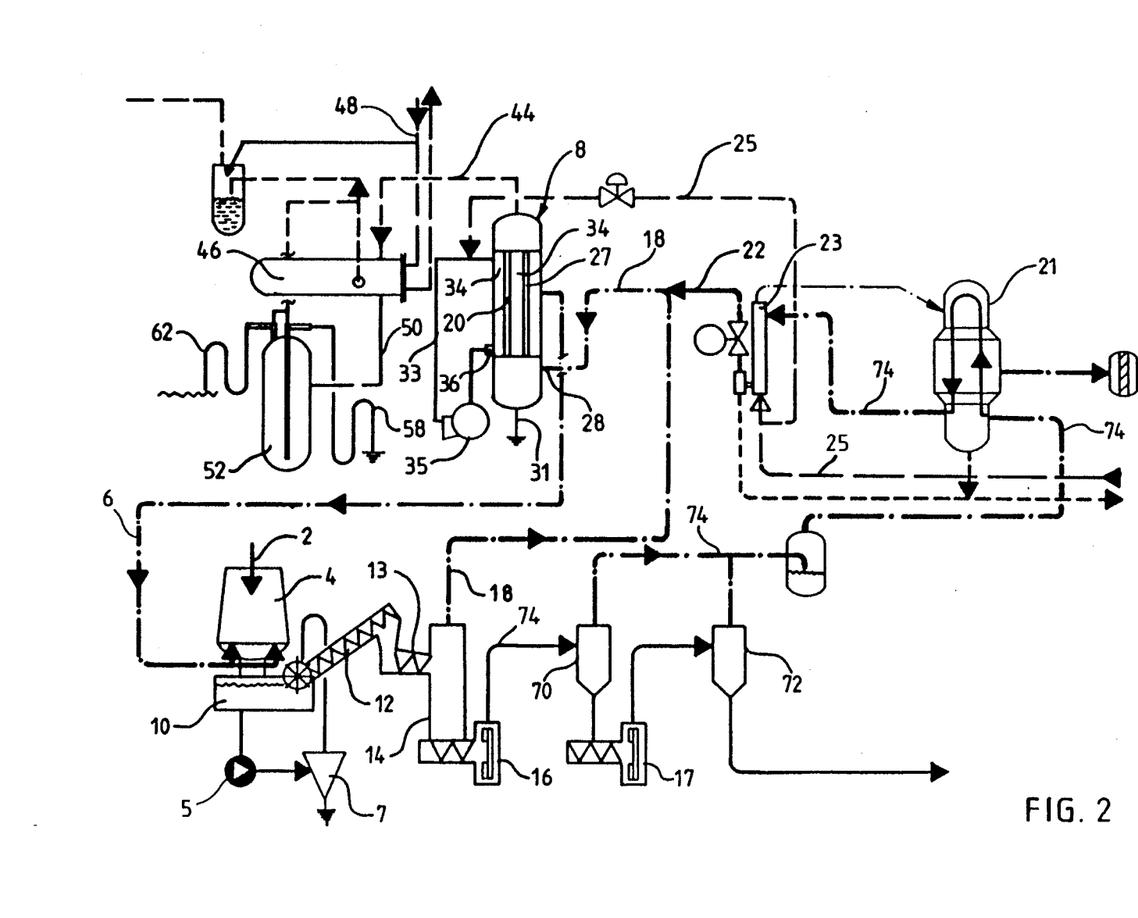
FIG. 2 is a schematic flow diagram of a second embodiment of the present invention.

FIG. 2 shows an alternative embodiment of the present invention in which the turpentine evaporator reboiler 8 is fed with clean boiler feed water through line 25 instead of the condensed backflow of vent steam through the circulation loop including line 40 and pump 41 in FIG. 1. In the FIG. 2 embodiment, vapor stream 18 exiting preheater 14 at about 45 psig is fed through inlet 28 into evaporator condenser reboiler 8. As will be noticed, where possible, the same numerals in the drawings represent the same elements.

As mentioned above, if steam is generated from boiler feed water instead from the vapor exiting the preheater, it is not necessary to use a plate-type reboiler. In this instance tube bundles 27 may form the heat exchange surfaces in the turpentine reboiler 8. The vent steam from line 18 is thus condensed at the inside surfaces of the tube bundles which represent the condensing vapor zone 20. The boiler feed water is introduced into the boiling liquid zone 34 thus contacting the outside of tube bundles 27.

The condensation temperature and pressure in the condensing vapor zone 20 of evaporator condenser 8 is selected so that the temperature will be above the dew point temperature of the turpentine so that substantially only water condenses and the major portion of the turpentine leaves evaporator 8 through outlet 30 as turpentine-rich vapor phase. The waste water may be discharged through waste line 31. The turpentine-rich vapor phase exiting evaporator 8 through outlet 30 is fed to turpentine condenser 46 through line 44 and the condensate passed as stream 50 to decanter 52. The turpentine phase and the aqueous phase are separated in decanter 52 and the turpentine and the water removed through lines 62 and 58, respectively.

Boiler feed water is introduced into evaporator condenser reboiler 8 through boiler feed water line 25 which feeds into circulation loop 33 and into boiling liquid zone 34. As indicated above, the pressure in the boiling liquid zone 34 is maintained at lower level than the pressure in the condensing vapor zone 20 so as to effect a lower boiling point temperature of the feed water and to cause heat transfer from the condensing vapor zone 20 to the boiling liquid zone 34. Clean steam generated in the boiling liquid zone 34 is thereafter fed to steaming vessel 4 through line 6 at a pressure ranging from about 5 to about 20 psig. As clean boiler feed water is used in the embodiment of FIG. 2 the steam exiting the evaporator for presteaming the woodchips in vessel 4 is clean steam.

As is seen in FIGS. 1 and 2, a plug screw 13 prevents backflow of steam into screw feeder 12. About 20% of the steam generated in the refiner 16 by the addition of mechanical energy flows backwards into preheater 14 and from there through line 18 to evaporator condenser reboiler 8. The pulp and the remainder of the steam are fed from first stage refiner 16 through line 74 into cyclone 7 in which the steam is directed through line 74 to TMP main reboiler 21 while the pulp is transferred to a second stage refiner 17. The content of second stage refiner 17 is fed into cyclone 7 from the bottom of which the pulp is withdrawn while the remaining steam is fed into line 74 for introduction into main reboiler 21. The vent steam from reboiler 21 is fed through line 74 to vent heater 23 and from there through line 22, and combined with the steam from line 18, fed into evaporator condenser reboiler 8 through inlet 28. In the condensing vapor zone 20 of evaporator condenser reboiler 8 the incoming steam is separated into a turpentine-rich fraction or phase which exits the evaporator through line 4 and waste condensate which is discharged through waste discharge line 31.

Figure 3:
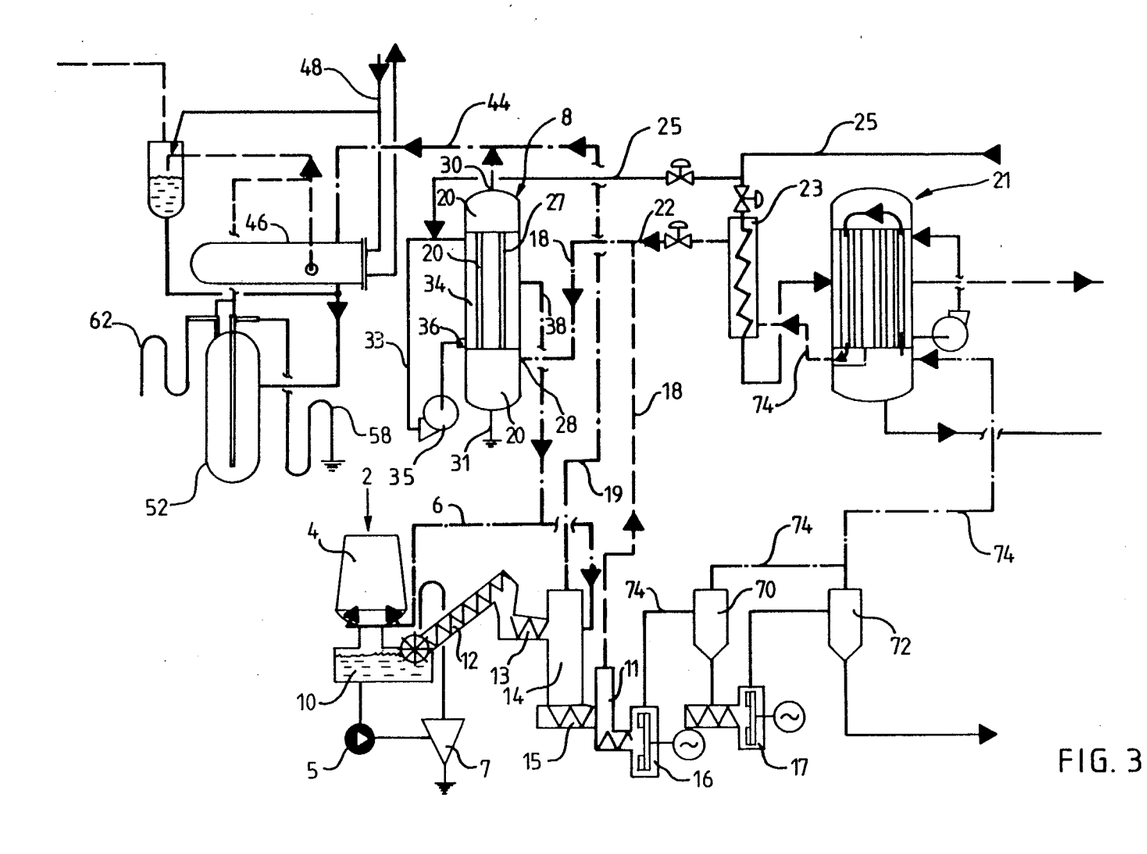
FIG. 3 is a schematic flow diagram of a third embodiment of the present invention.

FIG. 3 is similar to the embodiment shown and described in FIG. 2 except that the entire amount of backflow steam from refiner 16 is fed through chamber 11 and line 18 to inlet 28 of evaporator condenser reboiler 8. The so-called "primary refiner backflow steam" exiting chamber 11 through line 18 has a pressure of about 30 psig. As in the other embodiments, the vent steam from the main reboiler 21 is preferably added to the turpentine evaporator condenser reboiler 8 by combining it with the steam coming from the preheater 14 (FIGS. 1 and 2) or chamber 11 (FIG. 3), respectively. The advantage in this embodiment is that the preheater 14 is operated at a pressure considerably lower than the pressure prevalent in refiner 16. As in the FIG. 2 embodiment, boiler feed water is used to generate steam in the boiling liquid zone 34 by indirect heat exchange with the primary refiner backflow steam introduced into the condensing vapor zone 20. The clean steam exiting evaporator condenser reboiler 8 through outlet 38 for presteaming and preheating the woodchips in presteamer 4 and preheater 14 has a pressure of about 5 to about 20 psig. The different operating pressures in preheater 14 and chamber 11 are established by providing a first plug screw 13 and a second plug screw 15. Turpentine containing vent steam exiting preheater 14 through line 19 is fed directly into turpentine condenser 46. Stream 19 is combined with turpentine-rich vapor from evaporator 8 and turpentine is separated from the aqueous phase as described above.

In the embodiments of FIGS. 2 and 3 boiler feed water is fed to the boiling liquid zone 34 of the turpentine evaporator condenser reboiler instead of condensate from backflow of vent steam as in FIG. 1. Therefore, the embodiments of FIGS. 2 and 3 have the added advantage that there is no need for circulating condensate from boiling liquid zone 34 through pump 41 and line 40 and distributor mean 32 as shown and described in connection with FIG. 1. In addition, because of the use of boiler feed water in the embodiments of FIGS. 2 and 3 instead of condensate for vapor generation in boiling liquid zone 34 there is no need for heat exchangers 54 and 56. Instead, turpentine-rich vapor exiting evaporator condenser reboiler 8 through outlet 30 is fed directly to turpentine condenser 46 through line 44 and from there to decanter 52 and is separated in known manner as described above.

EXAMPLE 1

420 kg/h of backflow steam at 130° C. is vented to the preheater as backflow steam. 250 kg/h is condensed by preheated 2000 kg/h woodchips from 50° C. to 145°C., the remainder 170 kg/h containing 2.5 kg/h turpentine is vented, 153 kg/h of which is condensed in the condenser-reboiler and 17 kg/h of which is vented from the condenser as a turpentine-rich stream. 120 kg/h of boiler feed water is boiled off and provided as heating steam in the presteamer to heat the chips from 5° C. to 75° C. 2.5 kg/h turpentine, i.e. 95% of the turpentine content in the vented steam is recovered. Different temperatures of the incoming chips will change the requirements of steam to the presteamer.

EXAMPLE 2

420 kg of backflow steam at 130° C. is vented to the condenser-reboiler. 400 kg is condensed in the reboiler by producing 390 kg of clean steam at 120° C. from boiler feedwater. Part of the 390 kg is used to heat woodchips in the preheater from 50° C.-145° C. and woodchips in the presteamer from 5° C.-75° C. The remaining part is used for heating of process water of the total flow of 420 kg backflow steam, 20 kg containing 2.5 kg turpentine is condensed in a turpentine condenser together with 5 kg vent steam from the preheater and 5 kg of vent steam from the main reboiler.

The condensate produced in the turpentine condenser at 45° C.-55° C. flows to a turpentine decanter. Different temperatures of the incoming chips will change the requirements of steam to the presteamer.

While preferred embodiments and examples have been shown and described, it will be understood that the invention is intended to cover all modifications and alternate constructions falling within the scope of the invention as defined in the appended claims.

What is claimed is:

1. A method for recovering turpentine and heat in a thermomechanical pulping process wherein woodchips are presteamed and preheated and turpentine containing vapor is vented, from a preheater in which the woodchips are preheated prior to being refined, comprising the steps of:
   (a) generating turpentine containing vapor in a refiner;
   (b) causing at least part of the turpentine containing vapor to backflow toward said preheater;
   (c) withdrawing at least part of said turpentine containing vapor prior to said refiner;
   (d) passing the withdrawn turpentine containing vapor to an evaporator condenser reboiler having a condensing vapor zone and a boiling liquid zone; introducing said turpentine containing vapor into said condensing vapor zone and condensing at least a portion of said turpentine containing vapor to produce a condensate and a turpentine-rich vapor phase;
   (e) withdrawing the turpentine-rich vapor phase from the evaporator and passing the vapor phase to a turpentine condenser and cooling the vapor phase by indirect heat exchange contact with a cooling liquid to a temperature sufficiently low to produce a condensate containing immiscible turpentine and aqueous phases;
   (f) separating the immiscible phases into a turpentine phase and an aqueous phase;
   (g) introducing an aqueous medium into said boiling liquid zone of said evaporator condenser reboiler;
   (h) generating steam from said aqueous medium by indirect heat exchanging contact with said turpentine containing vapor in said vapor condensing zone; and
   (i) using said steam generated by contacting said aqueous medium in indirect heat exchange relation with said turpentine containing vapor to presteam the woodchips before they are supplied to the preheater.

2. The method according to claim 1, wherein the turpentine containing vapor is caused to flow countercurrent to the condensate in the condensing vapor zone of the evaporator.

3. The method according to claim 1, wherein the immiscible liquid phases are separated into a turpentine overflow phase and an aqueous underflow phase in a decanter.

4. The method according to claim 1, wherein from about 5% to about 10% of the vapor passed to the condensing vapor zone of the evaporator is passed to the turpentine condenser.

5. The method according to claim 1, wherein the condensate from the turpentine condenser is cooled by indirect heat exchange with a cooling liquid before the cooling liquid is passed to the turpentine condenser.

6. The method according to claim 1, wherein the separated aqueous phase is brought into indirect heat exchange contact with the condensate from the turpentine condenser.

7. A method for recovering turpentine and heat from a turpentine containing vapor in a pulping process wherein woodchips are presteamed and preheated prior to being refined in a refiner, said method comprising the steps of:
   (a) generating turpentine containing vapor in the pulping process;
   (b) causing at least a portion of said [steam]vapor to backflow from said refiner to said preheater;
   (c) passing said turpentine containing vapor to a turpentine evaporator reboiler comprising a condensing vapor zone and a boiling liquid zone;
   (d) introducing said turpentine containing vapor into said condensing vapor zone;
   (e) generating steam and turpentine-rich vapor by introducing an aqueous medium into said boiling liquid zone in indirect heat exchanging contact with said turpentine containing vapor in said condensing vapor zone; and
   (f) utilizing said steam for presteaming said woodchips.

8. The method of claim 7, additionally comprising the steps of:
   withdrawing said turpentine-rich vapor from said evaporator and passing said turpentine-rich vapor to a turpentine condenser and cooling said vapor by indirect neat exchange contact with a cooling liquid to a temperature sufficiently low to produce a condensate containing immiscible turpentine and aqueous phases;
   separating said immiscible phases into a turpentine phase and an aqueous phase.

9. The method of claim 8 further comprising the steps of:
   passing said condensate and said aqueous phase to said boiling liquid zone of said evaporator and bringing said condensate and said aqueous phase into indirect heat exchange contact with said turpentine containing vapor while maintaining a lower pressure in said boiling liquid zone then in said condensing vapor zone to produce said steam.

10. The method of claim 9, wherein said condensing vapor zone and said boiling liquid zone are formed by a plate-type heat exchanger such that the inside of the heat exchanger is the condensing vapor zone and the outside of said heat exchanger is said boiling liquid zone.

11. The method of claim 10, further comprising the steps of withdrawing said condensate from said boiling liquid zone; and reintroducing said condensate into said boiling liquid zone by allowing said condensate to flow substantially uniformly over the outside of said plate-type heat exchanger.

12. The method of claim 11, wherein said condensate from said turpentine condenser is cooled by indirect heat exchange with the cooling liquid before the cooling liquid is passed to the turpentine condenser.

13. The method of claim 11, wherein the separated aqueous phase is brought into indirect heat exchange contact with the condensate from the turpentine condenser.

14. The method of claim 7, wherein said aqueous medium is boiler feed water and wherein said condensing vapor zone and said boiling liquid zone are formed by one or more heat exchange tubes so that said condensing vapor zone comprises the inside of said tubes and said boiling liquid zone comprises the outside of said tubes.

15. The method of claim 14, wherein said steam exiting said boiling liquid zone is introduced into said presteamer.

16. The method of claim 7, wherein said turpentine containing vapor comprises preheater vent steam.

17. The method of claim 16, wherein said refiner backflow steam has a different pressure than said steam exiting said boiling liquid zone for presteaming said woodchips containing vapor comprises preheater vent steam.

18. The method of claim 7, wherein said turpentine containing vapor comprises essentially all of the refiner backflow steam.

19. The method of claim 7, wherein said turpentine containing vapor comprises substantially all of the refiner backflow steam and wherein said preheater vent steam is introduced directly into a turpentine condenser.

20. The method of claim 7, comprising the additional step of combining vent steam from a main reboiler with said turpentine containing steam prior to introduction thereof into said condensing vapor zone of s-id evaporator condenser reboiler.

21. The method of claim 7, wherein the temperature and pressure in the condensing vapor zone is selected so that the temperature at a given pressure is above the dew point temperature of the turpentine s that substantially only water condenses resulting in a turpentine-lean condensate and a turpentine-rich vapor phase.

22. The method of claim 7, wherein said aqueous medium is boiler feed water.

* * * * *

(12) EX PARTE REEXAMINATION CERTIFICATE (4853rd)
United States Patent
Ryham (10) Number: US 4,925,527 C1
(45) Certificate Issued: Sep. 30, 2003

(54) METHOD FOR THE RECOVERY OF TURPENTINE AND HEAT IN A REFINER PULPING PROCESS

(75) Inventor: Rolf Ryham, Princeton, NJ (US)

(73) Assignee: Ahlstromforetagen Svenska AB, Norrkoping (SE)

Reexamination Request:
No. 90/004,891, Jan. 13, 1998

Reexamination Certificate for:
Patent No.: 4,925,527
Issued: May 15, 1990
Appl. No.: 07/313,797
Filed: Feb. 22, 1989

(51) Int. Cl.$^7$ .............................................. D21C 11/06
(52) U.S. Cl. .............................. 162/15; 162/46; 162/47
(58) Field of Search ............................. 162/14, 15, 16, 162/46, 47

(56) References Cited

U.S. PATENT DOCUMENTS

| | | | |
|---|---|---|---|
| 3,432,402 A | 3/1969 | Herrlinger et al. | 203/37 |
| 3,816,239 A | 6/1974 | Marks | 162/15 |
| 4,012,279 A * | 3/1977 | Selander et al. | 162/23 |
| 4,231,842 A | 11/1980 | Ojala | 162/47 |
| 4,274,911 A | 6/1981 | Kroneld et al. | 162/15 |
| 4,437,316 A | 3/1984 | Dyer et al. | 62/79 |
| 4,954,221 A * | 9/1990 | Reinhall et al. | 162/23 |

OTHER PUBLICATIONS

J. Ahonen, D. Jean, S. Kooi and M. Tremblay, *Hymac Heat Recovery: Theoretical and Practical Aspects*, Pulp & Paper Canada, 85:11, Nov. 1984, p. T270–274 (paper presented 70th Annual Meeting of the Technical Section, Jan./Feb. 1984, at Montreal).

F. Beaulieu, *Heat Recovery From The Thermomechanical Pulping Process*, Pulp & Paper Canada, 91:9, Sep. 1990, P.T.334–336 (Paper presented at 75th Annual Meeting of the Technical Section, CPPA, at Montreal, Quebec, Jan. 31–Feb. 6, 1989).

B. Beckstrom, *Thermal Mechanical Pulping Heat Recovery, A System Approach*, paper prepared for, presented and disseminated at the Fall Meeting of the Techincal Association of the Pulp and Paper Industry TAPPI Mechanical Pulping Commitee, Sep. 21/22, 1983, Richmond, VA. (authenticating declaration submitted herewith).

G. Belotowski, *In TMP Plants Recovered Heat Is Recovered Money*, Canadian Pulp and Paper Industry,30:14, Oct. 1977, p. 30–32.

L. Dev, *Waste Heat Recovery: Heat Recovery In The Forest Products Industry*, Chemical Engineering Progress (AIChE), Dec. 1979, p. 25–29.

(List continued on next page.)

*Primary Examiner*—Steve Alvo (57) ABSTRACT

A method for recovering turpentine and heat in a TMP process in which woodchips are heated in a preheater and the vent vapors from the preheater are passed to the condensing vapor zone of an evaporator condenser-reboiler having a condensing vapor zone and a boiling liquid zone. A major portion of the vent vapors are condensed so as to produce a turpentine-lean condensate and turpentine-rich vapor phase. The turpentine-rich vapor phase is withdrawn from the evaporator and passed to a turpentine condenser where it is cooled by indirect heat exchange contact with a cooling liquid to produce a condensate containing immiscible turpentine and aqueous phases. The turpentine and the aqueous phases are separated. The aqueous phase and the condensate produced when vent vapors from the preheater are condensed are passed to the boiling liquid zone of the evaporator and brought into indirect heat exchange contact with the vent vapors from the preheater while maintaining a lower pressure in the boiling liquid zone than in the condensing vapor zone whereby a turpentine-lean vapor is produced. The turpentine-lean is used to presteam the woodchips before they are supplied to the heater.

OTHER PUBLICATIONS

J. Drew, J. Russell and H. Bajak, *Sulfate Turpentine Recovery*, Pulp Chemicals Association, 1971, New York, NY.

H. Edde, C. Isacson, H. Heinen and H. Wilson, *Process and Economic Evaluation For Pressurized Steam Recovery From TMP*, TAPPI Journal 67:9, Sep. 1984, p. 86–89.

J. Fedler, *Optimizing Turpentine Recovery* paper prepared for, presented and disseminated at the Southwest Local Section of the Technical Association of the Pulp and Paper Industry Meeting, Jun. 25–26, 1987, in Shreveport, LA. (authenticating declaration submitted herewith.).

R. Franzen, *Efficient Heat Recovery and High–Quality Refiner Pulp*, Pulp & Paper Canada, 84:6, Jun. 1983, p. T134–139 (presented at Annual Meeting of Technical Section, CPPA, Jan. 1982, at Montreal).

R. Franzen, *Heat Recovery, Chemical Treatments Give Refiner Pulping Its Versatility*, Pulp & Paper, Jun. 1983, p. 113–117 (reprinted from Tech. Assn. of Pulp & Paper Industry, 1982 Pulping Conference, Atlanta, GA, p. 137–145.

K. Hill, *What's New In Glycol Heating and Recovery Systems?*, PIMA, Mar. 1982, p. 16–20.

E. Hooper and C. Batis, *Heat Recovery Systems For Thermomechanical Pulping Installations*, Proceedings of the International Mechanical Pulping Conf. Proceedings, Jun. 6–10, 1977, Helsinki, Finland, 13 pages; published by Finn Pap Eng Assoc, Helsinki, Finl, 1977 vol. 4 Pap 44, 13p.

L. Ichinose, *Augusta Newsprint Expands It's Horizons—and It's Market; The Equipment*, Paper Industry Management Association (PIMA), Apr. 1984, p. 26–32.

W.F. Lahner, *Heat Recovery Optimization with Sprout–Waldron Refiners*, Pulp & Paper Canada, 85:11, Nov. 1984, p. T283–288 (paper presented Jan./Feb. 1984 at 70th Annual Meeting of the Technical Section, Canadian Pulp & Paper Assoc., Montreal, Canada).

W.F. Lahner and D.H. Teretka, *High TMP Refiner Consistencies, Pressures Optimize Heat Recovery*, Pulp & Paper, 55:6, Jun. 1981, p. 127–131.

N. McCubbin, *Generation of Steam From TMP Mill Exhaust (An Idea Whose Time Has Come)*; Pulp & Paper Canada, 82:3, Mar. 1981, p. 23–25.

N. McCubbin and M.A. Tyler, *Steam From TMP Exhausts, Attractive Possibility For Energy Conservation;* Canadian Pulp and Paper Industry, p. 70–74 (proceedings of the 67th Annual Meeting of the Technical Section, CPPA at Montreal, Jan. 1981 p. B191–196).

C. McMillan, *Recovering High Pressure Steam at Augusta Newsprint*, Pulp & Paper Canada, 85:11, Nov. 1984, p. T280–282 (paper presented at 70th Annual Meeting of the Technical Section, CPPA, Jan./Feb. 1984, at Montreal).

A. Metsavirta and M. Leppanen, *Improved Profitability Of Thermomechanical Pulping Using Computer Control And Effective Heat Recovery*, TAPPI Journal 63:7, Jul. 1980, p. 37–41 (paper presented at International Mechanical Pulping Conference, Toronto, Ontario, Jun. 11–14, 1979.).

K. Meyer and G. Bolotowsky, *Equipment for Maximizing Steam Recovery from Mechanical Pulping Systems*, Pulp & Paper Canada, 85:11, Nov. 1984, p. T289–292 (paper presented at 70th Annual Meeting of the Technical Section, CPPA, Jan./Feb. 1984, at Montreal).

K. Meyer and Harold E. Peterson, *Steam Recovery Optimization Through Pressure–Pressure TMP*, Southern Pulp & Paper, Mar. 1984, p. 30–33 (presented at the 1983 TAPPI Engineering Conference, Dallas, TX, and published in the Conference Proceedings at p. 343).

Operator's Manual for C–E Bauer 3R Heat Recovery System installed at Bowater Southern Paper Co., Calhoun, TN pulp and paper mill, 1985 start up. (authenticating declaration submitted herewith).

S. Pandelidis and A. Bertrand, *Low Cost Hot Water From TMP And Other Sources*, Pulp & Paper Canada, 86:11, Nov. 1985, p. T343–346 (paper presented Jan./Feb. 1984 at 70th Annual Meeting of the Technical Section, Canadian Pulp & Paper Assoc., Montreal, Canada).

H.E. Peterson, *Saving Energy In The TMP Mill*, Southern Pulp & Paper, Nov. 1980, p. 34–36.

R.G. Rockhill & David W. Hostetter, *Evaporator/reboiler Recovers Steam, Turpentine From TMP Refiners*, Pulp & Paper, 56:10, Oct. 1982, p. 106–108.

R.C. Roth, *Generation of High Pressure Steam from Low Temperature Waste Heat Sources*, Pulp & Paper Canada, 83:12, Dec. 1982, p. T336–341 (paper presented at 68th Annual Meeting of Technical Section, CPPA, Jan. 1982 at Montreal, Canada).

J. Rydqvist, *Energy Recovery in a TMP Newsprint Mill*, Kemisk Tidskrift, No. 9, 1980.

R. Ryham, *Publishers Installs a New TMP Heat Recovery System at Oregon City Mill*, Pulp & Paper, Mar. 1984, p. 78–79.

N. Sayegh, M. Azarniouch and S. Prahacs, *Study On The Recovery of Steam From Thermomechanical Pulping by Vapor Recompression*, Pulp & Paper Canada, 84:5, May 1983, p. T111–117.

O. Smith, J. Mason, B. Engstrom & M. Jackson, *Heat Recovery at The Bathurst CTMP Mill*, Pulp & Paper Canada 85:11, Nov. 1984, p. T275–279 (paper presented Jan./Feb. 1984 at 70th Annual Meeting of the Technical Section, Canadian Pulp & Paper Assoc., Montreal, Canada).

M. Wellisch, J.K. Bewtra, A.W. Gnyp and C.C. St.Pierre, *BCTMP Process—Identification Of Its Process Emissions*, Environmental Conference TAPPI Proceedings—1988 Environmental Conf. of the Technical Assoc. of the Pulp & Paper Industry, Charleston, S.C., p. 157–164.

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–22 is confirmed.

New claims 23–39 are added and determined to be patentable.

23. *A method as recited in claim 1 wherein the refiner comprises a first refiner, and further utilizing a second refiner and a main reboiler; and wherein said method further comprises:*
   *(j) passing refined wood chips from the first refiner to the second refiner;*
   *(k) generating turpentine containing vapor in the second refiner;*
   *(l) passing the turpentine containing vapor from the second refiner to the main reboiler to produce vent steam; and*
   *(m) combining vent steam from the main reboiler with the turpentine containing steam from step (d) prior to introduction thereof into the condensing vapor zone of the evaporator condenser reboiler.*

24. *A method as recited in claim 1 further comprising step (j), between steps (i) and (a), of washing the presteamed chips prior to passage to the refiner.*

25. *A method as recited in claim 24 wherein (i) is practiced to heat the chips to a temperature of about 70–90° C.*

26. *A method as recited in claim 24 comprising the further step (k), after (j) and before (a), of feeding the washed chips under high pressure by a screw feeder and plug screw into the preheater; and wherein (b) is practiced to heat the chips in the preheater to a temperature of about 110–150° C.*

27. *A method as recited in claim 25 comprising the further step (k), after (j) and before (a), of feeding the washed chips under high pressure by a screw feeder and plug screw into the preheater; and wherein (b) is practiced to heat the chips in the preheater to a temperature of about 110–150° C.*

28. *A method as recited in claim 23 further comprising step (m), between steps (i) and (a), of washing the presteamed chips prior to passage to the refiner.*

29. *A method as recited in claim 28 wherein (i) is practiced to heat the chips to a temperature of about 70–90° C.*

30. *A method as recited in claim 29 comprising the further step (n), after (m) and before (a), of feeding the washed chips under high pressure by a screw feeder and plug screw into the preheater; and wherein (b) is practiced to heat the chips in the preheater to a temperature of about 110–150° C.*

31. *A method as recited in claim 28 comprising the further step (n), after (m) and before (a), of feeding the washed chips under high pressure by a screw feeder and plug screw into the preheater; and wherein (b) is practiced to heat the chips in the preheater to a temperature of about 110–150° C.*

32. *A method as recited in claim 7 further comprising step (g), between steps (f) and (a), of washing the presteamed chips prior to passage to the refiner.*

33. *A method as recited in claim 32 wherein (f) is practiced to heat the chips to a temperature of about 70–90° C.*

34. *A method as recited in claim 32 comprising the further step (h), after (g) and before (a), of feeding the washed chips under high pressure by a screw feeder and plug screw into the preheater; and wherein (b) is practiced to heat the chips in the preheater to a temperature of about 110–150° C.*

35. *A method as recited in claim 33 comprising the further step (h), after (g) and before (a), of feeding the washed chips under high pressure by a screw feeder and plug screw into the preheater; and wherein (b) is practiced to heat the chips in the preheater to a temperature of about 110–150° C.*

36. *A method as recited in claim 20 further comprising step (g), between steps (f) and (a), of washing the presteamed chips prior to passage to the refiner.*

37. *A method as recited in claim 36 wherein (f) is practiced to heat the chips to a temperature of about 70–90° C.*

38. *A method as recited in claim 36 comprising the further step (h), after (g) and before (a), of feeding the washed chips under high pressure by a screw feeder and plug screw into the preheater; and wherein (b) is practiced to heat the chips in the preheater to a temperature of about 110–150° C.*

39. *A method as recited in claim 37 comprising the further step (h), after (g) and before (a), of feeding the washed chips under high pressure by a screw feeder and plug screw into the preheater; and wherein (b) is practiced to heat the chips in the preheater to a temperature of about 110–150° C.*

* * * * *